United States Patent
Takekawa

(10) Patent No.: US 9,212,724 B2
(45) Date of Patent: Dec. 15, 2015

(54) MESHED GEAR FOR VEHICLE

(75) Inventor: Hiroshi Takekawa, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/007,390

(22) PCT Filed: Mar. 29, 2011

(86) PCT No.: PCT/JP2011/057758
§ 371 (c)(1),
(2), (4) Date: Sep. 25, 2013

(87) PCT Pub. No.: WO2012/131890
PCT Pub. Date: Oct. 4, 2012

(65) Prior Publication Data
US 2014/0013885 A1 Jan. 16, 2014

(51) Int. Cl.
*F16H 1/04* (2006.01)
*F16H 55/14* (2006.01)
*F16H 57/00* (2012.01)

(52) U.S. Cl.
CPC ................ *F16H 1/04* (2013.01); *F16H 55/14* (2013.01); *F16H 57/0006* (2013.01); *Y10T 74/19642* (2015.01)

(58) Field of Classification Search
CPC . F16D 23/06; F16D 2023/0656; F16D 23/04; F16D 23/0606; F16D 1/08; F16D 11/10; F16D 2023/0631; F16D 2023/0681; F16D 2023/0637; F16D 2023/0625; F16D 27/118; F16H 3/089; F16H 3/38

USPC ............... 74/412 R, 411, 409, 414, 339, 462, 74/574.4, 573.12; 475/149, 257, 347; 464/68.3, 68.8, 180

See application file for complete search history.

(56) References Cited

U.S. PATENT DOCUMENTS

| | | | | |
|---|---|---|---|---|
| 3,109,317 A * | 11/1963 | Cousino et al. | .................. | 74/411 |
| 3,364,819 A * | 1/1968 | Ackley | .......................... | 418/196 |
| 4,710,152 A * | 12/1987 | Ichikawa et al. | .............. | 474/166 |
| 4,794,816 A * | 1/1989 | Serizawa et al. | ............. | 74/574.4 |
| 4,912,998 A * | 4/1990 | Sugano et al. | .................. | 74/409 |
| 6,354,416 B1 * | 3/2002 | Eo | ............................ | 192/53.341 |
| 7,926,381 B2 * | 4/2011 | Grosskopf et al. | .............. | 74/462 |
| 8,051,738 B2 * | 11/2011 | Brust et al. | ....................... | 74/462 |
| 8,132,480 B2 * | 3/2012 | Allen et al. | ....................... | 74/462 |
| 8,225,690 B2 * | 7/2012 | Shimada et al. | ................ | 74/443 |
| 8,429,992 B2 * | 4/2013 | Braford | ........................... | 74/331 |
| 8,511,451 B2 * | 8/2013 | Ledetzky et al. | ......... | 192/53.341 |
| 8,556,054 B2 * | 10/2013 | Hiraiwa | ..................... | 192/53.34 |
| 2002/0020597 A1* | 2/2002 | Cho | ........................ | 192/53.343 |
| 2005/0144940 A1* | 7/2005 | Yoshida et al. | ................. | 60/487 |

(Continued)

FOREIGN PATENT DOCUMENTS

CN 101939569 A 1/2011
DE 102009015946 A1 10/2010

(Continued)

*Primary Examiner* — William Kelleher
*Assistant Examiner* — Jude Agendia
(74) *Attorney, Agent, or Firm* — Sughrue Mion, PLLC

(57) ABSTRACT

It is provided a meshed gear for a vehicle disposed in a power transmission path between an engine and drive wheels and made up of a pair of gears meshed with each other, at least one gear making up the meshed gear having a ring shape, and the one gear having an outer circumferential portion disposed with an additional vibration system.

2 Claims, 6 Drawing Sheets

(56) References Cited

U.S. PATENT DOCUMENTS

| | | | |
|---|---|---|---|
| 2007/0199786 A1* | 8/2007 | Hiraiwa | 192/53.34 |
| 2009/0255368 A1* | 10/2009 | Kiener et al. | 74/573.12 |
| 2010/0101366 A1* | 4/2010 | Braford | 74/665 G |
| 2010/0216555 A1* | 8/2010 | Le Moal | 464/61.1 |
| 2010/0326223 A1 | 12/2010 | Lang | |
| 2011/0241500 A1* | 10/2011 | Lamke et al. | 310/75 D |

FOREIGN PATENT DOCUMENTS

| | | |
|---|---|---|
| JP | 61-164855 U | 10/1986 |
| JP | 5-87358 U | 11/1993 |
| JP | 610642 U | 2/1994 |
| JP | 6-288461 A | 10/1994 |
| JP | 9-273618 A | 10/1997 |
| JP | 10-281259 A | 10/1998 |
| JP | 11-247938 A | 9/1999 |
| JP | 2000-220726 A | 8/2000 |
| JP | 2001-235011 A | 8/2001 |
| JP | 2002-195386 A | 7/2002 |
| JP | 2005-337380 A | 12/2005 |
| JP | 2010121761 A | 6/2010 |
| WO | 0133105 A2 | 5/2001 |

* cited by examiner

FIG.2

| | CONVENTIONAL | | PRESENT INVENTION |
|---|---|---|---|
| | FLANGE TYPE GEAR | RING TYPE GEAR | RING TYPE GEAR + ADDITIONAL VIBRATION SYSTEM |
| BOOMING NOISE, RATTLING NOISE | × | ○ | ◎ |
| GEAR NOISE | ○ | × | ○ |
| GEAR STRUCTURE | 64a | 64b | 100, 102, 104, 64c |

MESHED GEAR FOR VEHICLE

CROSS REFERENCE TO RELATED APPLICATIONS

This application is a National Stage of International Application No. PCT/JP2011/057758 filed Mar. 29, 2011, the contents of which are incorporated herein by reference in their entirety.

TECHNICAL FIELD

The present invention relates to a structure of a meshed gear making up a power transmission path of a vehicle and particularly to a structure of a meshed gear achieving reduction of both booming and rattling noises and gear noise generated during power transmission through gears.

BACKGROUND ART

A power transmission path between an engine and drive wheels is disposed with a plurality of pairs of gears meshed with each other and drive power of the engine is transmitted via these meshed gears to the drive wheels. Such a meshed gear is known to generate booming noise and rattling noise during power transmission. The booming noise is vehicle interior noise occurring because vibrations are caused by torque variation of the engine and transmitted via a transmission (gearbox) through a drive shaft and a suspension to the inside of a vehicle. The rattling noise is vehicle interior noise occurring because when vibrations are caused by torque variation of the engine and transmitted to the transmission, collision of gears with each other so-called rattling (tooth hitting) occurs in meshed gears in the transmission and the rattling causes a case surface of the transmission to vibrate and generate noise, which is transmitted to the inside of a vehicle. With regard to reduction of these booming and rattling noises, it is known that if gear inertia (moment of inertia) of gears disposed in the power transmission path is increased, the booming noise and the rattling noise can be improved since a level of response of gears to the torque variation of the engine is reduced.

It is also known that the meshed gear generates gear noise during power transmission. Meshing of gears (a driving gear and a driven gear) always has a rotation angle error relative to ideal rotational motion. The rotation angle error corresponds to an advance or a delay of the driven gear relative to the driving gear and is also referred to as a mesh transmission error. This mesh transmission error is generated due to a manufacturing error of a gear, an assembly error, and elastic deformation of a gear, a support shaft, a case, etc., and the mesh transmission error cannot be set to zero. The presence of the mesh transmission error generates a meshing point coercive force acting as a vibration source of the gear noise, resulting in the gear noise.

A mechanism of generation of the gear noise will be described with reference to FIG. 6. FIG. 6 is a schematic of a meshed state between a driving gear 150 and a driven gear 160. In FIG. 6, when X1 and X2 denote respective displacements (rotational displacements) of the driving gear 150 and the driven gear 160 at a meshing point, a mesh transmission error TE is expressed by the following Equation (1). When φ1 and φ2 denote respective compliances of the driving gear 150 and the driven gear 160 at the meshing point, the displacement X1 of the driving gear 150 and the displacement X2 of the driven gear 160 are expressed by the following Equations (2) and (3), respectively. F1 and F2 are coercive forces (meshing point coercive forces) at the meshing point of the driving gear 150 and the driven gear 160 and are in the relationship of F1=−F2 due to the action-reaction relationship. When X is a response displacement generated by applying a force F to a structure, the compliance φ is a physical amount acquired by dividing the displacement X by the force F and represented with a frequency axis. For example, when the compliance φ is smaller, the displacement X becomes smaller relative to the force F and when the compliance φ is larger, the displacement X becomes larger relative to the force F.

$$TE = X1 - X2 \quad (1)$$

$$X1 = \phi 1 \times F1 \quad (2)$$

$$X2 = \phi 2 \times F2 \quad (3)$$

From Equations (1) to (3) and the relationship of F1=−F2, the following equation (4) is established. In Equation (4), 1/(φ1+φ2) is defined as meshing point dynamic rigidity. It is known from Equation (4) that the meshing point coercive force F1 becomes smaller when the compliances φ1 and φ2 are made larger. Therefore, if the compliances φ1 and φ2 are made larger, the meshing point coercive force F1 becomes smaller and the gear noise is reduced.

$$F1 = TE/(\phi 1 + \phi 2) \quad (4)$$

To reduce the meshing point coercive force F1, Patent Document 1 discloses a technique of reducing the meshing point dynamic rigidity by attaching an annular member (in a plate shape) on a side surface of a gear of a flange so that the annular member acts as an additional vibration system.

PRIOR ART DOCUMENT

Patent Document

Patent Document 1: Japanese Laid-Open Patent Publication No. 2000-220726

SUMMARY OF THE INVENTION

Problem to be Solved by the Invention

To make the compliances φ1 and φ2 larger as described above, the gear inertia (moment of inertia) of gears must be reduced. However, if the gear inertia (moment of inertia) is reduced, the booming noise and the rattling noise described above are conversely increased. To reduce the booming noise and the rattling noise, the gear inertia (moment of inertia) must be increased to make the compliances φ1 and φ2 smaller in contrast to the gear noise. Therefore, the measures running counter to each other are required for reducing the booming noise and the rattling noise and reducing the gear noise. To reduce the gear noise, the compliance is increased to reduce the gear noise in Patent Document 1; however, the booming noise and the rattling noise cannot be reduced.

The present invention was conceived in view of the situations and it is therefore an object of the present invention to provide a meshed gear for a vehicle disposed on a power transmission path between an engine and drive wheels and made up of a pair of gears meshed with each other, the meshed gear being capable of achieving reduction in both the booming and rattling noises and the gear noise generated during power transmission.

Means for Solving the Problem

To achieve the object, the first aspect of the invention provides (a) a meshed gear for a vehicle disposed in a power transmission path between an engine and drive wheels and made up of a pair of gears meshed with each other, wherein (b) at least one gear making up the meshed gear has a ring shape, and wherein (c) the one gear has an outer circumferential portion disposed with an additional vibration system.

Effects of the Invention

Consequently, since the one gear making up the meshed gear has a ring shape, the moment of inertia of the gear increases as compared to flange-shaped gears and, therefore, the booming noise and the rattling noise are reduced. The booming noise and the rattling noise are problems in a lower frequency range. In this regard, since the additional vibration system is not vibrated and is caused to act simply as an inertial system in the lower frequency range, the moment of inertia further increases by the additional vibration system and the booming noise and the rattling noise are effectively reduced. In a higher frequency range in which the gear noise occurs, the additional vibration system can be vibrated to increase compliance and to reduce a meshing point coercive force acting as a vibration source of the gear noise, thereby reducing the gear noise. In other words, the effect of increase in the moment of inertia due to forming the gear into a ring shape and adding the additional vibration system can be counteracted by vibrating the additional vibration system. As a result, the reduction of the booming noise and the rattling noise can be achieved at the same time with the reduction of the gear noise.

Preferably, the additional vibration system is made up of a ring-shaped mass member disposed on an outer circumferential side of the one gear and an elastic member connecting the mass member and the outer circumferential portion of the one gear. As a result, the moment of inertia can be increased by the mass member in the lower frequency range in which the booming noise and the rattling noise occur while the additional vibration system can be vibrated in the higher frequency range in which the gear noise occurs, thereby increasing the compliance to reduce the gear noise.

Preferably, the elastic member is made up of metal springs. As a result, the elastic member is not vibrated and is caused to act as an inertial system in the lower frequency range so that the additional vibration system can effectively be vibrated in the frequency range in which the gear noise occurs.

BRIEF DESCRIPTION OF THE DRAWINGS

FIG. 2 is a diagram of a relationship between a gear structure and the booming, rattling, and gear noises when the counter driven gear of FIG. 1 is taken as an example.

MODE FOR CARRYING OUT THE INVENTION

An example of the present invention will now be described in detail with reference to the drawings. The figures are simplified or deformed as needed in the following example and portions are not necessarily precisely depicted in terms of dimension ratio, shape, etc.

EXAMPLE

Figure 1:
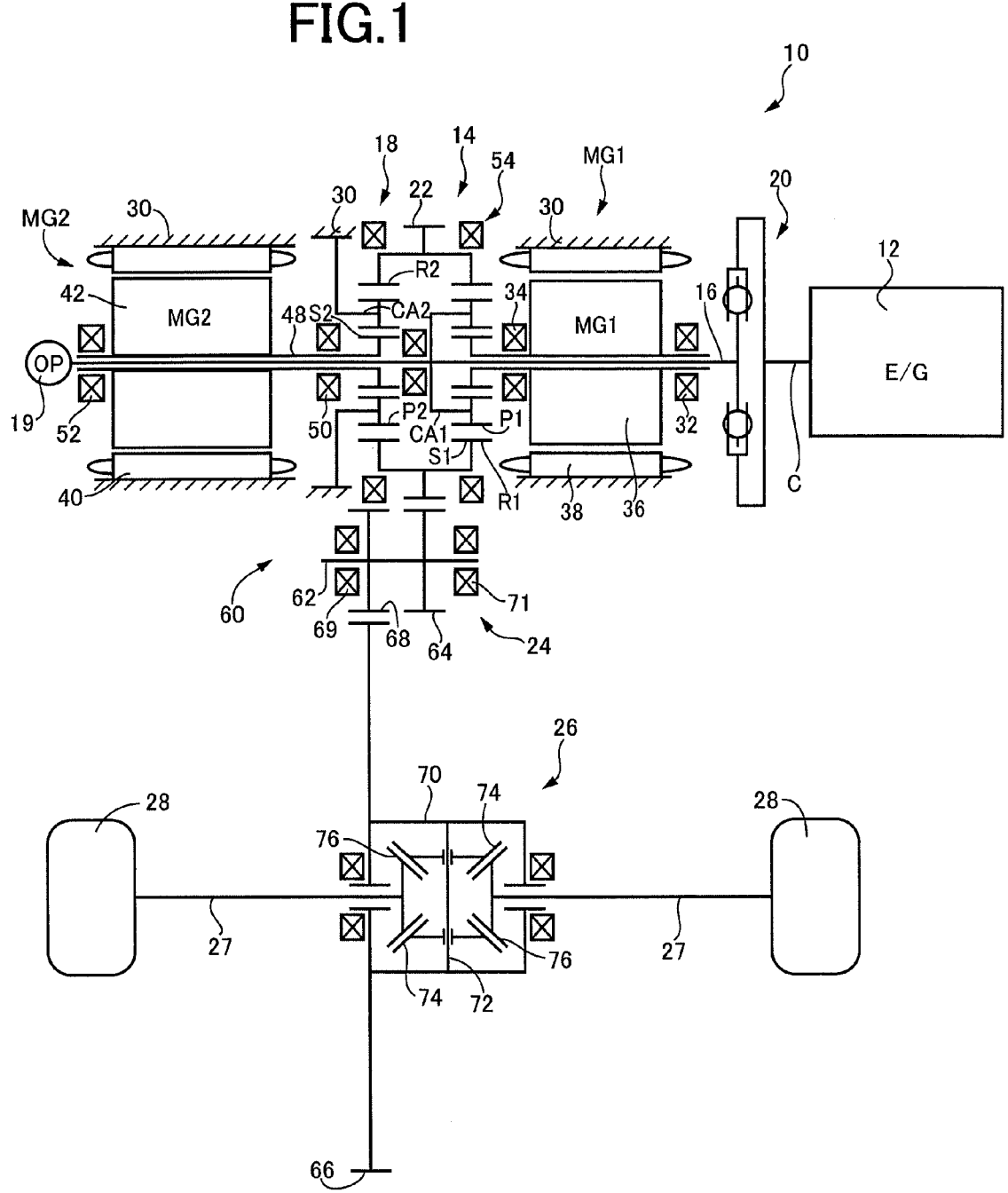
FIG. 1 is a schematic for explaining a general configuration of a hybrid vehicle power transmission device to which the present invention is applied.

FIG. 1 is a schematic for explaining a general configuration of a hybrid vehicle power transmission device 10 (hereinafter referred to as a power transmission device 10) to which the present invention is applied. As depicted in FIG. 1, the power transmission device 10 includes an engine 12, a first electric motor MG1, a first planetary gear device 14 coupled to the engine 12 and the first electric motor MG1 in a power transmittable manner and acting as a power distribution mechanism appropriately distributing or combining the drive power of the engine 12 and the first electric motor MG1, a second electric motor MG2, and a second planetary gear device 18 acting as reduction gears reducing the rotation of the second electric motor MG2 on a coaxial center C. The drive power of the engine 12 is transmitted through a damper device 20, the first planetary gear device 14, an output gear 22, a reduction gear device 24, a differential gear device 26, and left and right axles 27 to drive wheels 28. A mechanical oil pump 19 operated by rotation of an output shaft 16 of the engine 12 is connected at an end portion on the side opposite to the engine 12 in the axial direction. As described above, since the engine 12, the first electric motor MG1, the first planetary gear device 14, the second planetary gear device 18, and the second electric motor MG2 are arranged on the axial center C, the power transmission device 10 is reduced in size in the radial direction.

Although the first electric motor MG1 and the second electric motor MG2 are so-called motor generators also having an electric generation function, the first electric motor MG1 acts as a differential motor for controlling a differential state as a power distribution mechanism and at least has a generator (electric generation) function for generating a reaction force. The second electric motor MG2 is coupled to the drive wheels 28 in a power transmittable manner and at least has a motor (electric motor) function for acting as an electric motor for running outputting the drive power as a drive power source for running. The second electric motor MG2 mainly acts as the drive power source for running and therefore is made larger than the first electric motor MG1. In other words, an inertia of the second electric motor MG2 is made lager than an inertia of the first electric motor MG1.

The first electric motor MG1 includes on the coaxial center C a cylindrical rotor 36 acting as a rotor having the both ends in the axial direction rotatably supported by a bearing 32 and a bearing 34, and a cylindrical stator 38 acting as a stator disposed on the outer circumferential side of the rotor 36 and non-rotatably fixed by a case 30 that is a non-rotating member.

The second electric motor MG2 includes on the coaxial center C a cylindrical stator 40 acting as a stator connected to the case 30 to be non-rotatably fixed, and a cylindrical rotor 42 acting as a rotor disposed on the inner circumferential side of the stator 40. The inner circumferential side of the rotor 42 is connected to a cylindrical rotation shaft 48. The rotation shaft 48 is rotatably supported at the both ends by a bearing 50 and a bearing 52 to be rotatably supported around the axial center C along with the rotor 42 connected to the rotation shaft 48. An end portion of the rotation shaft 48 on the engine 12 side in the axial direction is connected to a sun gear S2 described later of the second planetary gear device 18.

The first planetary gear device 14 is made up of a single pinion type planetary gear device and includes a sun gear S1, a ring gear R1 disposed concentrically with the sun gear S1 and meshed with the sun gear S1 via a pinion gear P1, and a carrier CA1 supporting the pinion gear P1 in a rotatable and revolvable manner. The sun gear S1 of the first planetary gear device 14 is coupled to the rotor 36 of the first electric motor MG1 and the carrier CA1 is coupled to the engine 12 via the output shaft 16 and the damper device 20 while the ring gear R1 is mechanically coupled to the left and right drive wheels 28 via the output gear 22, the reduction gear device 24, the differential gear device 26, and the left and right axles 27.

The second planetary gear device 18 is disposed to be aligned with the first planetary gear device 14 around the common axial center C and acts as a mechanism reducing and outputting the rotation of the second electric motor MG2. The second planetary gear device 18 is made up of a single pinion type planetary gear device and includes the sun gear S2, a ring gear R2 disposed concentrically with the sun gear S2 and meshed with the sun gear S2 via a pinion gear P2, and a carrier CA2 supporting the pinion gear P2 in a rotatable and revolvable manner. The sun gear S2 of the second planetary gear device 18 is coupled to the rotor 42 of the second electric motor MG2 via the rotation shaft 48 and the carrier CA2 is coupled to the case 30 that is the non-rotating member while the ring gear R2 is mechanically coupled to the left and right drive wheels 28 via the output gear 22, the reduction gear device 24, the differential gear device 26, and the axles 27 as is the case with the ring gear R1. The rotation of the second electric motor MG2 input from the sun gear S2 is reduced and output from the ring gear R2.

In this example, a so-called compound type compound gear 54 is used that has internal teeth of the ring gear R1 of the first planetary gear device 14 and internal teeth of the second ring gear R2 formed side-by-side in the axial direction on the inner circumferential side with external teeth of the output gear 22 formed on the outer circumferential side. Since a plurality of gear functions is integrated into the compound gear 54 as described above, the power transmission device 10 is made compact.

The reduction gear device 24 is made up of a counter driven gear 64 disposed on a counter shaft 62 and meshed with the output gear 22 (counter drive gear), and a final drive gear 68 disposed on the counter shaft 62 and meshed with a final driven gear 66 of the differential gear device 26, and reduces and transmits the rotation of the output gear 22 to the final driven gear 66. The counter shaft 62 is rotatably supported by a pair of bearings 69 and 71 and each of the gears is made up of a helical gear.

The differential gear device 26 is of a known bevel-gear type and includes a differential case 70 connected to the final driven gear 66 of the differential gear device 26, a pinion shaft 72 supported at the both ends by the differential case 70, a pinion gear 74 inserted through the pinion shaft 72 to be relatively rotatable around the rotation axis of the pinion shaft 72, and a pair of side gears 76 meshed with the pinion gear 74. A pair of the side gears 76 is respectively spline-fitted to and integrally rotated with the left and right axles 27. The differential action of the differential gear device 26 applies a rotation difference to the left and right axles 27 (the drive wheels 28) depending on a running state of the vehicle.

In FIG. 1, booming noise, rattling noise, and gear noise are problematically generated in a meshing portion between the output shaft 22 (counter drive gear) and the counter driven gear 4 and a meshing portion between the final drive gear 68 and the final driven gear 66. The booming noise is vehicle interior noise occurring because vibrations are caused by torque variation of the engine 12 and transmitted via the left and right axles 27 and a suspension not depicted to the inside of the vehicle. The rattling noise is vehicle interior noise occurring because when vibrations are cause by torque variation of the engine 12, collision of gears with each other so-called rattling (tooth hitting) occurring in the meshing portion is transmitted to the case 30 and the rattling causes a surface of the case 30 to vibrate and generate noise, which is transmitted to the inside of the vehicle. Both of these booming and rattling noises are known to be reduced by the increasing moment of inertia of gears. This is because when the moment of inertia becomes larger, the effect of torque variation of the engine 12 is suppressed. The output gear 22 and the counter driven gear 64 make up a meshed gear for a vehicle made up of a pair of gears meshed with each other of the present invention.

FIG. 2 depicts a relationship between a gear structure and the booming, rattling, and gear noises, for example, when the counter driven gear 64 is taken as an example. As depicted on the left side of FIG. 2, a conventional gear is a counter driven gear 64a (hereinafter, a driven gear 64a) formed into a flange shape (a flange type gear). This flange type driven gear 64a makes the moment of inertia of the driven gear 64a smaller and is disadvantageous in terms of the booming noise and the rattling noise. However, the flange type driven gear 64a is known as a structure advantageous in terms of the gear noise because of larger compliance φ.

On the other hand, as depicted in the center of FIG. 2, if the gear shape of the driven gear 64a is changed to a ring shape (ring type gear, driven gear 64b), the moment of inertia of the driven gear 64b is increased and the booming noise and the rattling noise are improved. However, since the ring type driven gear 64b makes the moment of inertia larger and the rigidity higher, the compliance φ is made smaller, which is disadvantageous in terms of the gear noise.

In contrast, as depicted on the right side of FIG. 2, a driven gear 64c of this example has an additional vibration system 100 acting as a dynamic damper further disposed on the ring type driven gear 64b depicted in the center. The additional vibration system 100 disposed on the driven gear 64c is made up of a ring-shaped mass member 102, and an elastic member 104 connecting the mass member 102 with a gear main body.

Figure 3:
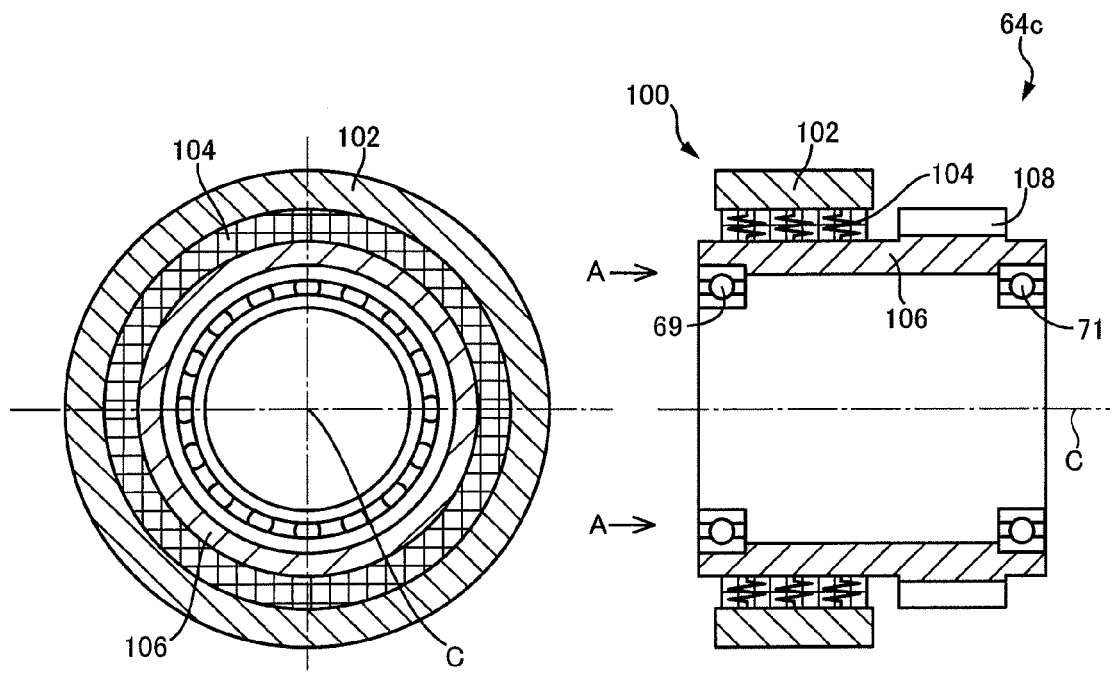
FIG. 3 is an enlarged view of the driven gear of FIG. 2, which is corresponding to the present invention.

FIG. 3 is an enlarged view of the driven gear 64c of FIG. 2. The left side of FIG. 3 is a view of the driven gear 64c viewed in the direction of an arrow A. As depicted in FIG. 3, the driven gear 64c is formed in a ring shape and the ring-shaped mass member 102 is connected via the elastic member 104 to an outer circumferential portion of a cylindrically formed main body 106 of the driven gear 64c, thereby forming the additional vibration system 100. A tooth portion 108 of the driven gear 64c meshed with the output gear 22 (counter drive gear) is formed side-by-side with the additional vibration system 100 in the axial direction. For the elastic member 104, a metal spring or a rubber member is preferably used. In the case of the driven gear 64c, the bearings 69 and 71 are disposed on the inner circumferential side of the main body 106.

Figure 4A:
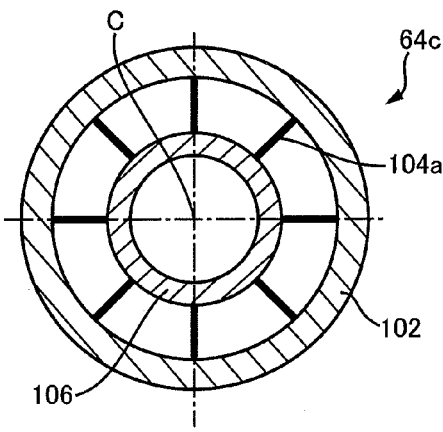
FIG. 4 are diagrams of a structure using metal springs as the elastic member of the driven gear of FIG. 3, which is corresponding to the present invention.
Figure 4B:
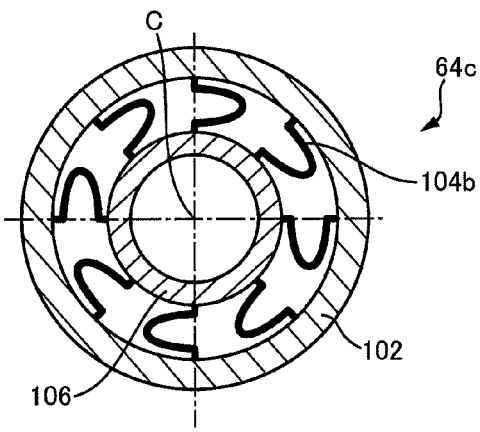
Figure 4C:
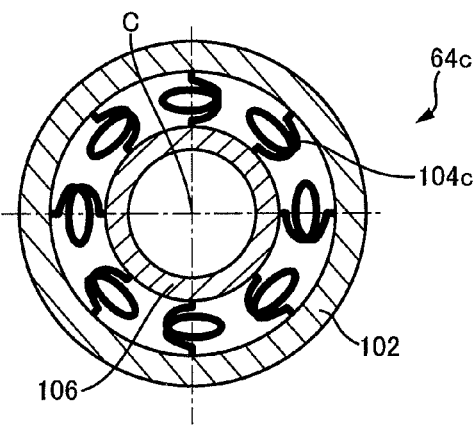

FIG. 4 depicts three examples of a structure using metal springs as the elastic member 104 of the driven gear 64c of FIG. 3. In FIG. 4(a), eight plate springs 104a are arranged at regular angular intervals as the elastic member 104 and the mass member 102 is connected by the plate springs 104a to the main body 106 of the driven gear 64c. In FIG. 4(b), eight U-shaped plate springs 104b are arranged at regular angular intervals as the elastic member 104 and the mass member 102 is connected by the U-shaped plate springs 104b to the main body 106 of the driven gear 64c. In FIG. 4(c), eight coil springs 104c are arranged at regular angular intervals as the elastic member 104 and the mass member 102 is connected by the coil springs 104c to the main body 106 of the driven gear 64c. A rubber member etc., may be used as the elastic member 104. Although the material and shape of the elastic member 104 are not limited as described above, the elastic member 104 are tuned in any case such that the elastic member 104 is not vibrated in a lower frequency range and is vibrated in a higher frequency range in which the gear noise occurs. Since the gear noise occurs in the higher frequency range, in fact, the metal springs are more reliable than the rubber material and are more preferable in consideration of easiness of the tuning. Because of the rigidity higher than the rubber material, the metal springs act as rigid members without vibrating in the lower frequency range and can effectively be vibrated in the frequency range in which the gear noise occurs.

Figure 5:
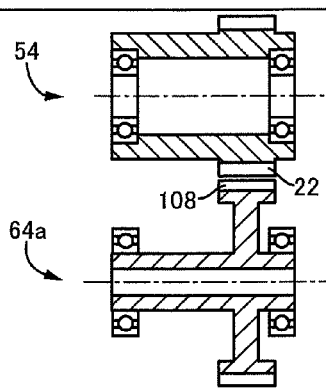
FIG. 5 is a diagram of calculation results of calculations in numerical simulation of the booming noise, the rattling noise, and the gear noise occurring in each type where a flange type, a ring type and a ring type with the additional vibration system corresponding to the present invention are employed as the gear structure of the driven gear meshed with the compound gear.
Figure 6:
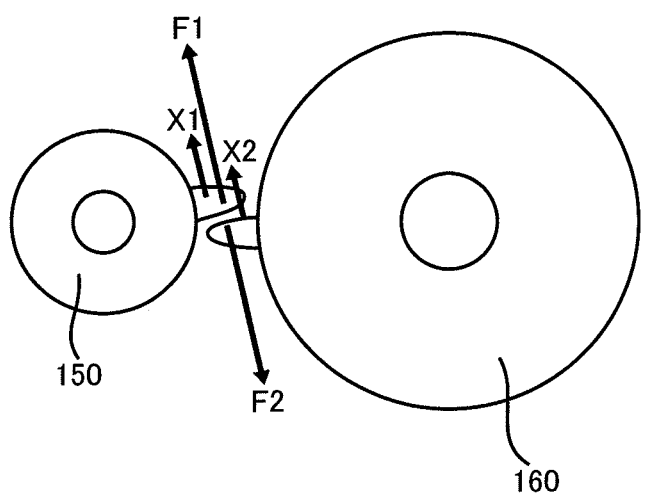
FIG. 6 is a schematic of a meshed state between a driving gear and a driven gear, is a diagram for explaining a mechanism of generation of the gear noise.

FIG. 5 depicts respective calculation results of calculations in numerical simulation of the booming noise, the rattling noise, and the gear noise occurring when the driven gears 64a, 64b, and 64c are used as the gear structure of the driven gear 64 meshed with the output gear 22 formed on the compound gear 54. A common shape was used for the compound gear 54 (the output gear 22). FIG. 5 depicts a calculation result of the flange type driven gear 64a on the left side, a calculation result of the ring type driven gear 64b in the center, and a calculation result of the driven gear 64c disposed with the additional vibration system 100 corresponding to the present invention on the right side. Two graphs depicted under each of the driven gears 64 depict a relationship between the frequency of the driven gear 64 and the meshing compliances φ1 (the compound gear 54 side) and φ2 (the driven gear 64 side) on the upper side and depict a relationship between the frequency of the driven gear 64 and the meshing point dynamic rigidity (=1/(φ1+φ2)) on the lower side. In the two graphs, the booming noise and the rattling noise are problems in a frequency range a (lower frequency range) and the gear noise b is a problem in a frequency range b (higher frequency range).

As depicted in FIG. 5, assuming that the moment of inertia of the flange type driven gear 64a is A, the moment of inertia of the ring gear type driven gear 64b is 4A and the moment of inertia of the driven gear 64c of the present invention is 7A. Therefore, by changing the flange type driven gear 64a to the ring gear type driven gear 64b, the moment of inertia is increased by four times. Since of the mass member 102 of the additional vibration system 100 is added, the driven gear 64c has the largest moment of inertia of 7A. Since a larger moment of inertia is advantageous in terms of the booming noise and the rattling noise, a booming and rattling noise performance is improved in the ring gear type driven gear 64b and the driven gear 64c of the present invention as compared to the flange type driven gear 64a, and the driven gear 64c with the largest moment of inertia is particularly advantageous in terms of the booming and rattling noise performance.

If the driven gear 64 is formed in a ring shape, the rigidity of the driven gear becomes higher and, therefore, the compliance φ2 is made smaller. This is represented in the graph of the relationship between the frequency of the driven gear 64 and the meshing compliances φ1 and φ2 of FIG. 5. To improve the booming and rattling noise performance, the compliances φ1 and φ2 must be lowered. Since the compound gears 54 have the common shape, the compliance φ1 on the compound gear 54 side is equal for the driven gears 64a to 64c. Therefore, smaller compliance φ2 is more advantageous for the booming and rattling noise performance. As depicted in FIG. 5, in the frequency range a, the flange type driven gear 64a has the compliance φ2 indicated by a thick solid line larger than the compliance φ2 of the ring gear type driven gear 64b and the driven gear 64c of the present invention. In other words, in the ring gear type driven gear 64b and the driven gear 64c of the present invention, the compliance φ2 is made smaller in the frequency range a and the booming and rattling noise performance is improved.

However, when the moment of inertia and rigidity of the driven gear 64 are larger, the compliance φ2 becomes smaller and, to the contrary, the meshing point dynamic rigidity (=1/(φ1+φ2)), i.e., the inverse of the compliances φ1 and φ2, becomes larger. Since the larger meshing point dynamic rigidity increases the meshing point coercive forces and makes a vibratory force of the gear noise larger, the gear noise is increased. In the graphs of the relationship between the frequency of the driven gear 64 and the meshing point dynamic rigidity of FIG. 5, the meshing point dynamic rigidity of the flange type driven gear 64a is indicated by thin lines for comparison with the ring gear type driven gear 64b and the driven gear 64c of the present invention. Focusing on the relationship between the frequency of the ring gear type driven gear 64b and the meshing point dynamic rigidity, in the frequency range b, the meshing point dynamic rigidity of the driven gear 64b indicated by the thick line is greater than the meshing point dynamic rigidity of the driven gear 64a indicated by the thin line. Therefore, it is understood that the driven gear 64a is more advantageous than the driven gear 64b in terms of a gear noise performance.

On the other hand, the driven gear 64c of the present invention has a level of the meshing point dynamic rigidity relatively unchanged as compared to the flange type driven gear 64a in the frequency range b. Therefore, gear noise characteristics of the driven gear 64c are not so different from the flange type driven gear 64a. This is because the vibration of the additional vibration system 100 increases the compliance φ2 in the frequency range b of the driven gear 64 in which the gear noise is a problem. In other words, the operation of the additional vibration system 100 in the frequency range b increases the compliance φ2 and reduces the gear noise. As a result, since the booming noise and the rattling noise are reduced while the gear noise is reduced, the driven gear 64c achieves both the reduction of the booming noise and the rattling noise and the reduction of the gear noise.

As described above, according to this embodiment, since the driven gear 64c making up a portion of the reduction gear device 24 has a ring shape, the moment of inertia of the gear increases as compared to flange-shaped gears and, therefore, the booming noise and the rattling noise are reduced. The booming noise and the rattling noise are problems in the lower frequency range. In this regard, since the additional vibration system 100 is not vibrated and is caused to act simply as an inertial system in the lower frequency range, the moment of inertia further increases and the booming noise and the rattling noise are effectively reduced. In the higher frequency range in which the gear noise occurs, the additional vibration system 100 can be vibrated to increase the compliance φ2 and to reduce the meshing point coercive force acting as a vibration source of the gear noise, thereby reducing the gear noise. In other words, the effect of increase in the moment of inertia due to forming the driven gear 64c into a ring shape and adding the additional vibration system 100 can be counteracted by vibrating the additional vibration system 100. As a result, the reduction of the booming noise and the rattling noise can be achieved at the same time with the reduction of the gear noise.

According to this embodiment, the additional vibration system 100 is made up of the ring-shaped mass member 102 disposed on the outer circumferential side of the main body 106 of the driven gear 64c and the elastic member 104 connecting the mass member 102 and the driven gear 64c. As a result, the moment of inertia can be increased by the mass member 102 in the lower frequency range in which the booming noise and the rattling noise occur while the additional vibration system 100 can be vibrated in the higher frequency range in which the gear noise occurs, thereby increasing the compliance to reduce the gear noise.

According to this embodiment, the elastic member 104 is made up of metal springs (the plate springs 104a, the U-shaped plate springs 104b, or the coil springs 104c). As a result, the elastic member 104 is not vibrated and is caused to act as an inertial system in the lower frequency range so that the additional vibration system 100 can effectively be vibrated in the frequency range in which the gear noise occurs.

Although the example of the present invention has been described in detail with reference to the drawings, the present invention is applied in other forms.

For example, although the example has been described by taking the meshed gear made up of the output gear 22 (counter drive gear) and the counter driven gear 64 as an example, this is not a limitation of the meshed gear and, for example, the gear structure of the present invention may be applied to the final drive gear 68 and the final driven gear 66. In other words, the present invention is applicable to any meshed gears transmitting drive power in a power transmission path between the engine and the drive wheels.

Although the present invention is applied to the power transmission device 10 of the hybrid vehicle in the example, the present invention is applicable not only to the hybrid vehicles but also to power transmission devices of other types such as a stepped automatic transmission and a stepless automatic transmission as long as the devices have a configuration including a meshed gear.

The above description is merely an embodiment and the present invention may be implemented in variously modified and improved forms based on the knowledge of those skilled in the art.

NOMENCLATURE OF ELEMENTS

12: engine
24: reduction gear device (meshed gear)
28: drive wheels
64c: counter driven gear (one gear)
100: additional vibration system
102: mass member
104: elastic member
104a: plate spring (metal spring)
104b: U-shaped plate spring (metal spring)
104c: coil spring (metal spring)

The invention claimed is:

1. A meshed gear for a vehicle disposed in a power transmission path between an engine and drive wheels and comprising:
   a pair of gears meshed with each other,
   at least one gear making up the meshed gear having a ring shape from one end to another end axially,
   the one gear having an outer circumferential portion with a dynamic damper disposed at least partially between the pair of meshed gears, disposed with a dynamic damper,
   the dynamic damper including a ring-shaped mass member disposed on an outer circumferential side of the one gear and an elastic member connecting the mass member and the outer circumferential portion of the one gear, and
   the mass member being connected only to the elastic member in a power transmittable manner.

2. The meshed gear for a vehicle of claim 1, wherein the elastic member is made up of metal springs.

* * * * *